(12) United States Patent
Ahmed et al.

(10) Patent No.: US 12,706,540 B2
(45) Date of Patent: Aug. 11, 2026

(54) ELECTRIC VEHICLE ENERGY STORAGE SYSTEMS FOR MITIGATING TRANSIENT LOAD CONDITIONS IN LOW VOLTAGE BUSES

(71) Applicant: GM GLOBAL TECHNOLOGY OPERATIONS LLC, Detroit, MI (US)

(72) Inventors: Mohamed Ahmed Kamel Ahmed, Birmingham, MI (US); Chandra S. Namuduri, Troy, MI (US); Rashmi Prasad, Troy, MI (US); Suresh Gopalakrishnan, Troy, MI (US); Lyall Kenneth Winger, Waterloo (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 718 days.

(21) Appl. No.: 18/097,394

(22) Filed: Jan. 16, 2023

(65) Prior Publication Data

US 2024/0243667 A1 Jul. 18, 2024

(51) Int. Cl.
*H02M 3/335* (2006.01)
*B60L 50/60* (2019.01)
(Continued)

(52) U.S. Cl.
CPC ......... *H02M 3/33573* (2021.05); *B60L 50/60* (2019.02); *H02J 7/345* (2013.01);
(Continued)

(58) Field of Classification Search
None
See application file for complete search history.

(56) References Cited

U.S. PATENT DOCUMENTS 5,796,595 A * 8/1998 Cross .................... H02M 3/285 363/71
7,230,405 B2 * 6/2007 Jang .................... H02M 3/1584 323/284

(Continued)

FOREIGN PATENT DOCUMENTS

CN 105480109 A 4/2016
DE 102010009260 A1 8/2011

(Continued)

OTHER PUBLICATIONS

U.S. Appl. No. 17/839,769, filed Jun. 14, 2022, Kamel et al.

(Continued)

*Primary Examiner* — Tynese V McDaniel

(57) ABSTRACT

An energy storage system includes a plurality of batteries coupled in series, a plurality of first isolated DC-DC power converters each having first and second sides, a DC bus coupled to the second sides of the plurality of first isolated DC-DC power converters, and a second isolated DC-DC power converter coupled in parallel with the plurality of first isolated DC-DC power converters. Each of the first sides of the plurality of first isolated DC-DC power converters is coupled to at least one of the batteries. The second isolated DC-DC power converter includes a first side coupled to the plurality of batteries and a second side coupled to the DC bus. The second isolated DC-DC power converter is configured to mitigate a transient load condition on the DC bus.

20 Claims, 8 Drawing Sheets

(51) Int. Cl.
*H02J 7/34* (2006.01)
*H02J 7/50* (2026.01)

(52) U.S. Cl.
CPC ........... *H02J 7/50* (2026.01); *H02M 3/33584* (2013.01); *B60L 2210/10* (2013.01); *H02J 2207/20* (2020.01)

(56) References Cited

U.S. PATENT DOCUMENTS 8,115,446 B2 2/2012 Piccard et al.
10,097,109 B1 * 10/2018 Ye .................... H02M 7/53871
10,131,245 B2 * 11/2018 Hand, III .............. H02M 3/285
10,298,026 B2 5/2019 Trimboli et al.
10,804,809 B1 * 10/2020 Yelaverthi ............... H02J 1/102
11,621,638 B1 * 4/2023 Zhang ..................... H02M 3/07 323/271
12,166,416 B2 * 12/2024 Leong ............... H02M 3/33592
12,308,673 B2 * 5/2025 Mi ........................ H02J 7/0019
2003/0031036 A1 * 2/2003 Kates .................. H02M 3/1584 363/65
2007/0057659 A1 * 3/2007 Noda ...................... H02M 3/07 323/282
2009/0206804 A1 * 8/2009 Xu ...................... H02M 3/1584 323/234
2010/0117593 A1 5/2010 Piccard et al.
2011/0051468 A1 * 3/2011 Kyono .................. H02M 3/285 363/21.02
2012/0133203 A1 * 5/2012 Lienkamp ............... B60L 58/12 307/9.1
2012/0155683 A1 * 6/2012 van Halteren ........... H04R 3/00 381/321
2012/0293021 A1 * 11/2012 Teggatz .................... H02J 3/46 307/151
2013/0207470 A1 * 8/2013 Stoev ...................... H02M 3/04 307/43
2014/0231139 A1 * 8/2014 Rozenblit ............. E21B 47/125 175/40
2015/0357815 A1 * 12/2015 Luh ....................... H02J 7/0063 307/31
2016/0294204 A1 10/2016 Deokar et al.
2016/0336765 A1 * 11/2016 Trimboli ............... H02J 7/0068
2017/0331386 A1 * 11/2017 Babazadeh ......... H02M 3/3376
2018/0123454 A1 * 5/2018 Symonds .................. H02J 1/10
2020/0056554 A1 * 2/2020 Sekita ..................... F02D 41/20
2020/0177083 A1 * 6/2020 Zambetti ............ G01R 31/3278
2020/0412148 A1 * 12/2020 Huang ..................... H05K 1/14
2022/0071302 A1 * 3/2022 Aradachi ................ A24F 40/50
2022/0166314 A1 * 5/2022 Chen ................... H02M 3/1584
2022/0321016 A1 * 10/2022 Khaligh ............ H02M 3/33561
2022/0368215 A1 * 11/2022 Ha .......................... H02M 1/32
2023/0006540 A1 * 1/2023 Wang .................. H02M 1/0095
2023/0299681 A1 * 9/2023 Wang ...................... H02M 1/36 315/307
2024/0120847 A1 * 4/2024 Jiang ................... H02M 3/1586
2025/0135942 A1 * 5/2025 Cawthorne ............. B60L 58/20

FOREIGN PATENT DOCUMENTS

DE 102012003309 A1 8/2013
DE 102016207286 A1 11/2017
DE 102021211179 A1 11/2022

OTHER PUBLICATIONS

Zhang, Fan et al. "Hybrid Balancing in a Modular Battery Manaement System for Electric-Drive Vehicles". Electrical and Computer Engineering, Utah State University. Logan, Utah—USA; 2017 IEEE; 6 pages.

Preindl, Mattias. "A Battery Balancing Auxiliary Power Module With Predictive Control for Electrified Transportation". IEEE Transactions on Industrial Electronics, vol. 65, No. 8, Aug. 2018; 8 pages.

Evzelman, Michael et al. "Active Balancing System for Electric Vehicles With Incorporated Low-Voltage Bus". IEEE Transactions on Power Electronics, vol. 31, No. 11, Nov. 2016; 9 pages.

German Office Action from counterpart DE1020231209752, dated Nov. 27, 2025.

* cited by examiner

ELECTRIC VEHICLE ENERGY STORAGE SYSTEMS FOR MITIGATING TRANSIENT LOAD CONDITIONS IN LOW VOLTAGE BUSES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to energy storage systems, and more particularly to energy storage systems for mitigating transient load conditions in low voltage buses.

Electric vehicles such as pure electric vehicles and/or plug-in hybrid electric vehicles include DC-DC power converters for powering a low voltage load. When the low voltage load changes, a low voltage bus coupled between the DC-DC power converters and the low voltage load may experience transient load conditions. Low voltage battery modules are often employed to support such transient load conditions.

SUMMARY

An energy storage system for an automotive vehicle includes a plurality of batteries coupled in series, a plurality of first isolated DC-DC power converters each having first and second sides, a DC bus coupled to the second sides of the plurality of first isolated DC-DC power converters, and a second isolated DC-DC power converter coupled in parallel with the plurality of first isolated DC-DC power converters. Each of the first sides of the plurality of first isolated DC-DC power converters is coupled to at least one of the batteries. The second isolated DC-DC power converter includes a first side coupled to the plurality of batteries and a second side coupled to the DC bus. The second isolated DC-DC power converter is configured to mitigate a transient load condition on the DC bus.

In other features, the system does not include a battery module coupled to the second sides of the plurality of first isolated DC-DC power converters.

In other features, second isolated DC-DC power converter is a bi-directional DC-DC power converter.

In other features, at least one of the plurality of first isolated DC-DC power converters is a bi-directional DC-DC power converter.

In other features, the system further includes at least one ultra-capacitor coupled to the DC bus.

In other features, the at least one ultra-capacitor has a capacitance of at least one farad.

In other features, the system further includes at least one controller coupled to the second isolated DC-DC power converter. The at least one controller is configured to control the second isolated DC-DC power converter at a switching frequency greater than a switching frequency of the plurality of first isolated DC-DC power converters.

In other features, a transient response time of the second isolated DC-DC power converter is faster than a transient response time of the plurality of first isolated DC-DC power converters.

In other features, the at least one controller is configured to detect the transient load condition, and in response to detecting the transient load condition, enable the second isolated DC-DC power converter.

In other features, each of the second sides of the plurality of first isolated DC-DC power converters are coupled in parallel.

An energy storage system for an automotive vehicle includes a plurality of batteries coupled in series, a plurality of isolated DC-DC power converters each having first and second sides, a DC bus coupled to the second sides of the plurality of isolated DC-DC power converters, and at least one ultra-capacitor coupled to the DC bus and the second sides of the plurality of isolated DC-DC power converters. Each of the first sides of the isolated DC-DC power converters is coupled to at least one of the batteries. The at least one ultra-capacitor is configured to mitigate a transient load condition on the DC bus. The system does not include a battery module coupled to the second sides of the plurality of isolated DC-DC power converters.

In other features, the at least one ultra-capacitor has a capacitance of at least one farad.

In other features, the plurality of isolated DC-DC power converters is a plurality of first isolated DC-DC power converters, and the system further includes a second DC-DC power converter coupled in parallel with the at least one ultra-capacitor.

In other features, the second DC-DC power converter is a non-isolated DC-DC power converter.

In other features, the system further includes at least one switching device coupled between the at least one ultra-capacitor and the DC bus.

In other features, each of the second sides of the plurality of isolated DC-DC power converters are coupled in parallel.

An energy storage system for an automotive vehicle includes a plurality of batteries coupled in series, a plurality of isolated DC-DC power converters each having first and second sides, a DC bus coupled to the second sides of the plurality of isolated DC-DC power converters, and at least one controller coupled to the plurality of isolated DC-DC power converters. Each of the first sides of the isolated DC-DC power converters is coupled to at least one of the batteries. The at least one controller is configured to control at least one isolated DC-DC power converter of the plurality of isolated DC-DC power converters at a switching frequency of 100 kHz or more to mitigate a transient load condition on the DC bus.

In other features, the switching frequency is between 100 KHz and 10 MHz.

In other features, the system does not include a battery module coupled to the second sides of the plurality of isolated DC-DC power converters.

In other features, each of the second sides of the plurality of isolated DC-DC power converters are coupled in parallel.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An EV includes DC-DC power converters that convert a voltage from one or more high voltage batteries to a lower voltage for a low voltage load coupled to the power converters. When the low voltage load changes (e.g., steps up, steps down, etc.), a low voltage bus coupled between the DC-DC power converters and the low voltage load may experience a transient load condition. For example, the change in the low voltage load (e.g., an increase or a decrease in current demand) may cause output voltages of the DC-DC power converters to change (e.g., decrease or increase) from regulated values as the power converters provide the necessary current to the low voltage load. After a period of time, the DC-DC power converters may again provide the output voltages at the regulated values.

Low voltage (or auxiliary) battery modules are used to support transient load conditions on the low voltage bus. For example, one or more low voltage battery modules (e.g., a 12V battery module, etc.) may be coupled to the low voltage bus and between the DC-DC power converters and the low voltage load. When the low voltage load changes and a transient load condition occurs, the low voltage battery modules smooth transient power by quickly providing the low voltage load necessary power while the DC-DC power converters return to their regulated state. However, low voltage battery modules are costly (e.g., about $550 per module) and large in size.

Energy storage systems according to the present disclosure includes solutions to mitigate the effect of transient power loads in low voltage buses. As a result, the size of low voltage battery modules coupled to the low voltage buses may be reduced, and in some cases the low voltage battery modules may be eliminated from the energy storage systems. In turn, costs and/or malfunctions associated with low voltage battery modules in electric vehicles are reduced while available space in the electric vehicles is increased.

Figure 1:
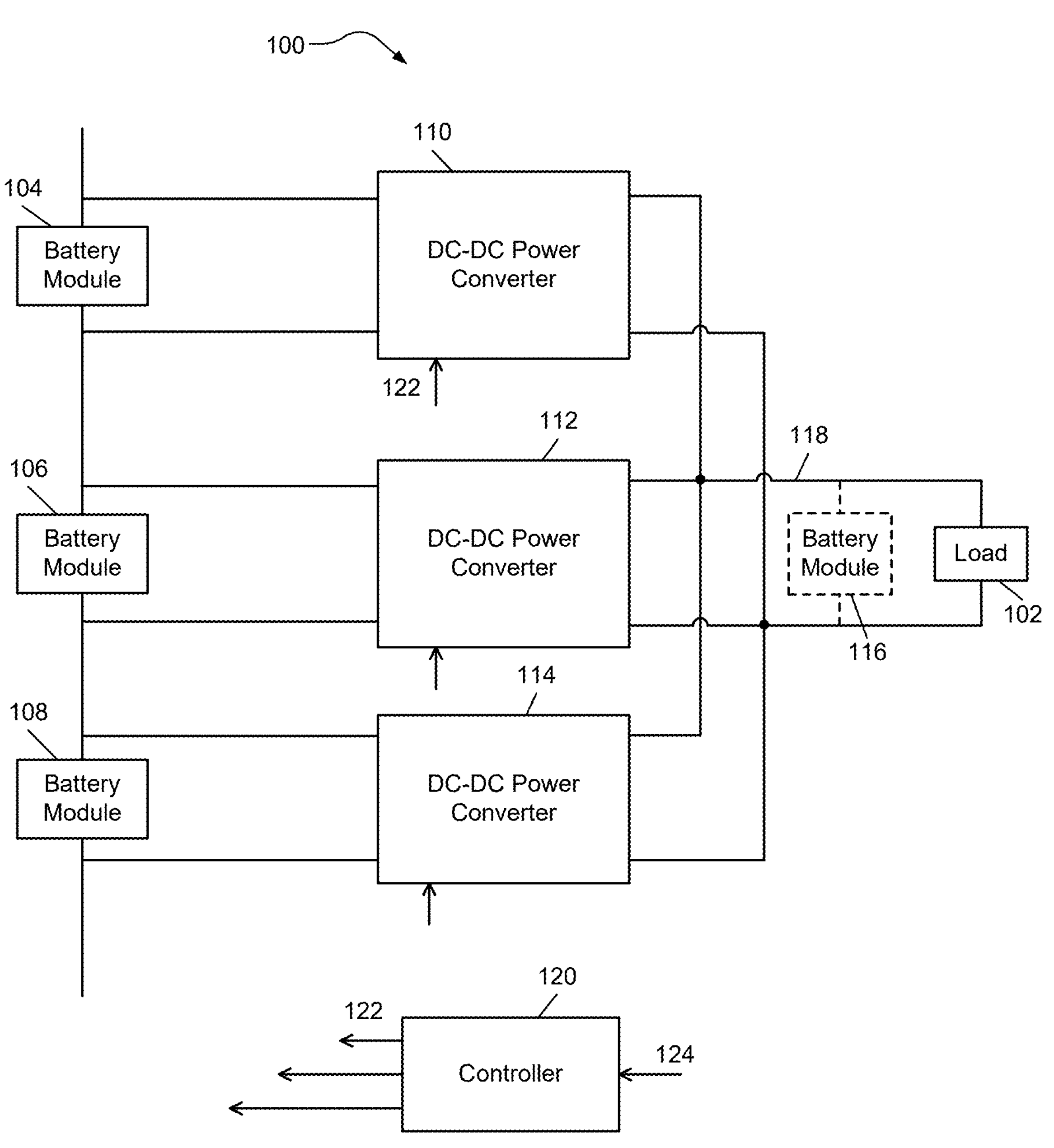
FIG. 1 is a functional block diagram of an energy storage system (ESS) including multiple DC-DC power converters according to the present disclosure.

Referring now to FIG. 1, an ESS 100 and a low voltage load 102 coupled to the ESS 100 are shown. The ESS 100 includes multiple high voltage battery modules 104, 106, 108 (e.g., 400V, etc.) coupled in series, multiple DC-DC power converters 110, 112, 114, and at least one low voltage battery module 116 (e.g., 12V, etc.) coupled to the DC-DC power converters 110, 112, 114 via a DC bus 118. Each battery module 104, 106, 108, 116 may include one or more battery cells. Although the ESS 100 of FIG. 1 is shown as including three battery modules 104, 106, 108 and three power converters 110, 112, 114, it should be appreciated that the ESS 100 may include more or less high voltage battery modules and/or power converters in other embodiments.

As shown in FIG. 1, the ESS 100 further includes a controller 120 coupled to the DC-DC power converters 110, 112, 114 for controlling the converters 110, 112, 114. While the controller 120 is shown as being separate from the converters 110, 112, 114, it should be appreciated that the controller 120 may include and/or be in communication with dedicated controllers for the power converters 110, 112, 114.

Each of the DC-DC power converters 110, 112, 114 may be an isolated power converter having opposing sides. One side (e.g., a high voltage side) of each power converter 110, 112, 114 is coupled to individual ones of the high voltage battery modules 104, 106, 108. For example, and as shown in FIG. 1, the power converter 110 is coupled to the battery module 104, the power converter 112 is coupled to the battery module 106, and the power converter 114 is coupled to the battery module 108. Each of the other sides (e.g., low voltage sides) of the power converters 110, 112, 114 are coupled in parallel and to the DC bus 118. In other embodiments, the low voltage sides of the power converters 110, 112, 114 of FIG. 1 may be coupled in another suitable configuration such as in a series configuration, a series-parallel configuration, etc.

The power converters 110, 112, 114 may operate unidirectionally or bi-directionally. For example, the power converters 110, 112, 114 may include a converter topology that allows power to flow in only one direction (e.g., from the high voltage side to the low voltage side) or both directions. When the power converters 110, 112, 114 operate bi-directionally, power may flow towards the low voltage load 102 for powering the load 102. Power may also flow towards the high voltage battery modules 104, 106, 108 for recharging or otherwise maintaining a target state of charge of the battery modules 104, 106, 108.

In various embodiments, the controller 120 controls at least one of the power converters 110, 112, 114 to mitigate a transient load condition on the DC bus 118. For example, the controller 120 may transmit one or more control signals 122 to the power converter 110 for controlling one or more switching devices in the converter 110 at a high switching frequency. As a result, the power converter 110 is able to react quickly to the transient load condition and provide (again) a regulated output at a desired value, thereby quickly mitigating the effect of the transient load condition. The power converters 112, 114 may be similarly controlled by the controller 120. Due to the power converters 110, 112, 114 being controlled in a manner to quickly mitigate the effect of the transient load condition, the low voltage battery module 116 may be reduced in size, and in some cases removed from the ESS 100.

The high switching frequency may be any suitable frequency value. For example, the high switching frequency may be about 100 kHz or more. In some embodiments, the switching frequency may be between about 100 KHz and about 10 MHz. For example, the switching frequency may be 100 kHz, 200 kHz, 300 kHz, 400 kHz, 500 kHz, 600 kHz, 700 kHz, 800 KHz, 900 kHz, 1 MHz, 5 MHz, 10 MHZ, and/or any other value therebetween. In yet other embodiments, the switching frequency may be more than 10 MHz.

In various embodiments, the controller 120 may adjust the switching frequency of one or more of the converters 110, 112, 114 after detecting a transient load condition. For example, the controller 120 may receive one or more feedback signals 124 representing one or more operating parameters (e.g., characteristics) of the power converters 110, 112, 114, the ESS 100, etc. For instance, the operating parameters may include voltages and/or currents on the low voltage sides of the converters, voltages and/or currents on the high voltage sides of the converters, a voltage and/or current of the DC bus 118, etc. Based on the received operating parameters, the controller 120 may detect a transient load condition. For example, the controller 120 may compare a rate of change of the bus current to a threshold, and then identify the transient load condition if the rate of change exceeds the threshold. In response to detecting the transient load condition on the DC bus 118, the controller 120 may control the power converters 110, 112, 114 to restore a voltage of the DC bus 118 to within desired voltage thresholds. For example, the controller 120 may increase the switching frequency of at least one of the converters 110, 112, 114 to about 100 kHz or more (and/or another suitable high switching frequency as provided above) and/or implement other control methods (e.g., in addition to frequency control) to restore a voltage of the DC bus 118 to within the desired voltage thresholds.

In some embodiments, the controller 120 may adjust (again) the switching frequency of one or more of the converters 110, 112, 114 after the transient load condition has passed. For example, the controller 120 may adjust (e.g., decrease) the switching frequency back to its pre-transient level after a defined period of time, after the received operating parameters indicate the transient load condition has passed, etc.

Figure 2:
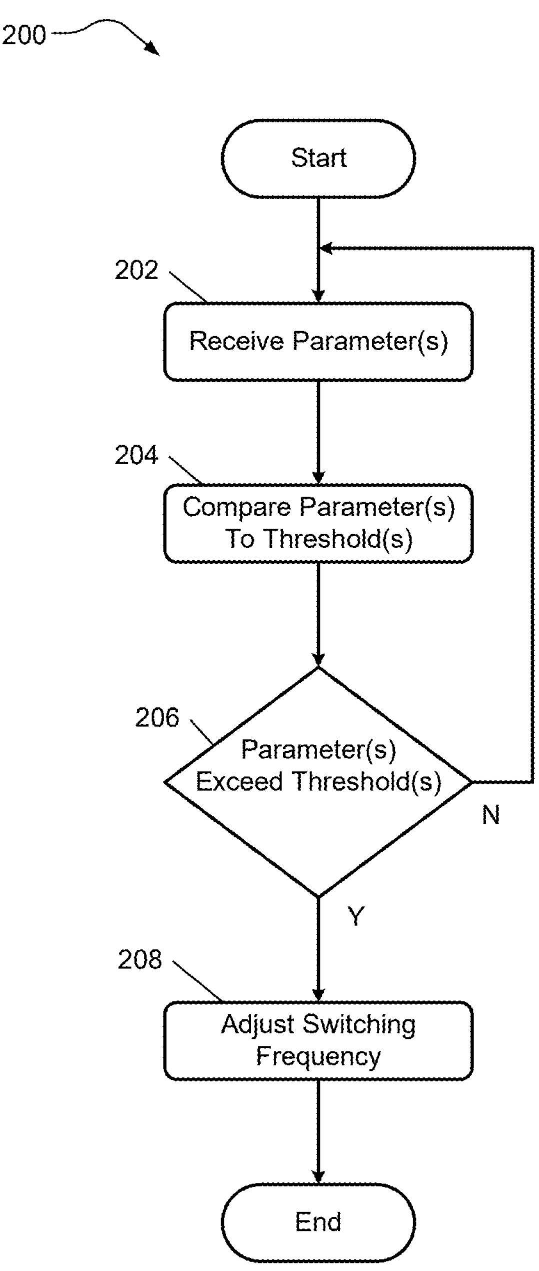
FIG. 2 is a flowchart of a control process for controlling one of the DC-DC power converters of FIG. 1 according to the present disclosure.

FIG. 2 illustrates an example control process 200 employable by the controller 120 of FIG. 1 for controlling the DC-DC power converter 110. Although the example control process 200 is described in relation to the controller 120 and the DC-DC power converter 110, the control process 200 may be employable by any of the controllers and the DC-DC power converters disclosed herein. The control process 200 may start when the controller 120 is powered-on and/or at another suitable time.

As shown in FIG. 2, control begins at 202, where controller 120 receives one or more operating parameters via, for example, one or more feedback signals. The operating parameters may include, for example, voltages and/or currents on the low and/or high voltage sides of the converters, a voltage and/or current of the DC bus 118, etc. Control then proceeds to 204.

At 204, the controller 120 compares at least one of the received operating parameters and/or a derivation thereof to at least one threshold. For example, and as explained above, the controller 120 may compare a rate of change of the bus current to a threshold. Control then proceeds to 206, where the controller 120 determines whether a transient load condition exists based on the comparison at 204. For example, at 206, the controller 120 may determine a transient load condition exists if any one of the received operating parameters and/or a derivation thereof exceeds an associated threshold. If not, control returns to 202. Otherwise, control proceeds to 208.

At 208, the controller 120 adjusts the switching frequency of the DC-DC power converter 110. For example, the controller 120 may increase the switching frequency of the power converter 110 to about 100 kHz or more (and/or another suitable high switching frequency as provided above). Control then may end.

In some examples, control may return to 202 after increasing the switching frequency of the power converter 110. In such examples, the controller 120 may determine that the transient load condition has lapsed (e.g., based on another comparison at 204), and then decrease the switching frequency of the DC-DC power converter 110 to a pre-transient level.

With continued reference to FIG. 1, in various embodiments the ESS 100 of FIG. 1 may include an additional DC-DC power converter coupled in parallel with the power converters 110, 112, 114. The additional DC-DC power converter may be configured to mitigate a transient load condition on the DC bus 118.

Figure 3:
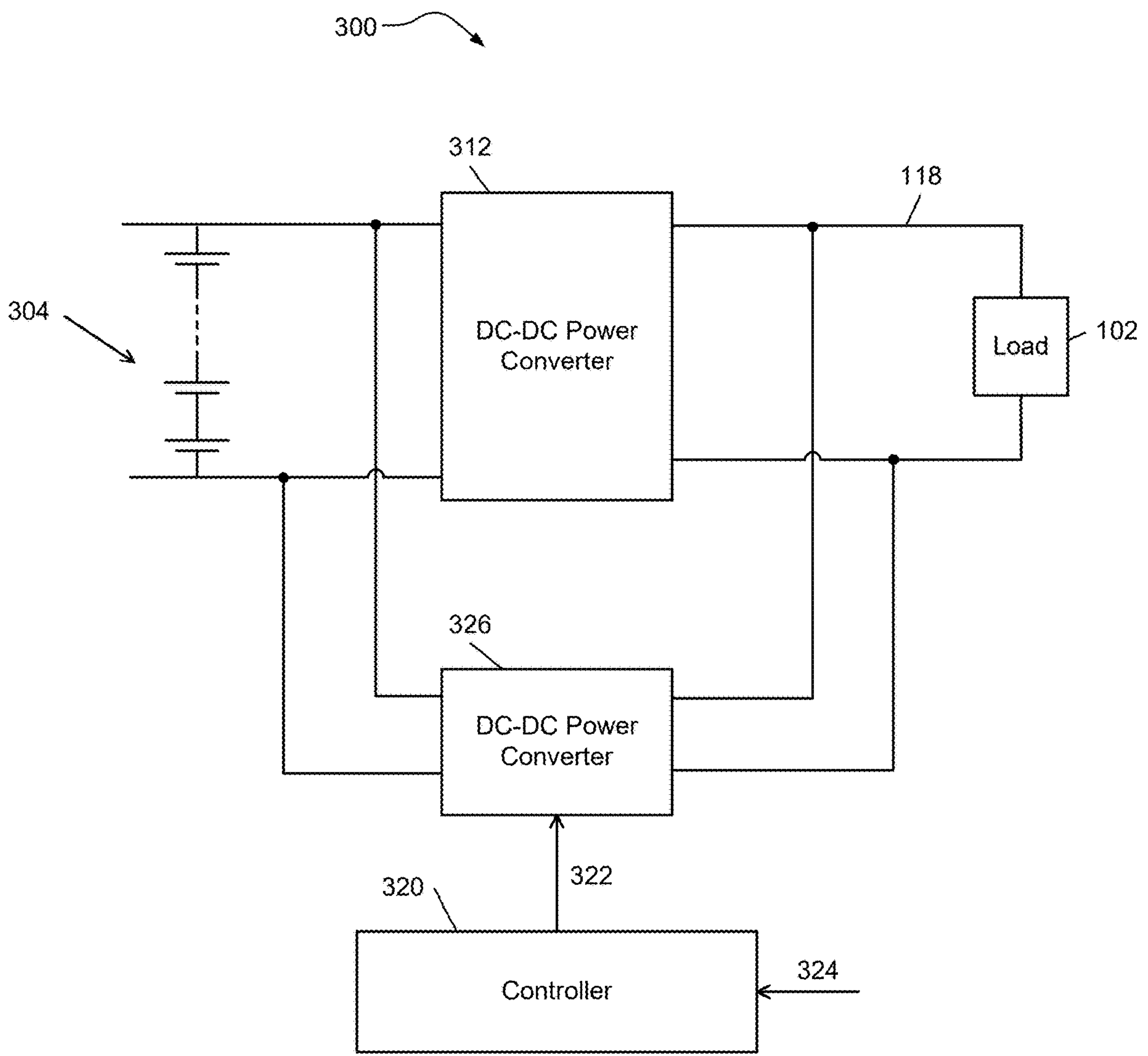
FIG. 3 is a functional block diagram of an ESS including a power converter coupled in parallel with a DC-DC power converter, according to the present disclosure.

For example, FIG. 3 illustrates an ESS 300 substantially similar to the ESS 100 of FIG. 1 but includes an additional DC-DC power converter. Specifically, the ESS 300 of FIG. 3 includes high voltage batteries 304, multiple DC-DC power converters 312, 326, and a controller 320. The power converter 312 is coupled between the high voltage batteries 304 and the low voltage load 102 of FIG. 1, and provides power to the low voltage load 102 via the DC bus 118 of FIG. 1. The high voltage batteries 304 may correspond to, for example, the battery modules 104, 106, 108 of FIG. 1. Additionally, the power converter 312 may be any one of the DC-DC power converters 110, 112, 114 of FIG. 1. Although the ESS 300 of FIG. 3 is shown as including only one power converter 312, it should be appreciated that the ESS 300 may include more power converters in other embodiments. For example, the ESS 300 may include the DC-DC power converters 110, 112, 114 of FIG. 1.

The DC-DC power converter 326 may be an isolated power converter having opposing sides. For example, one side (e.g., a high voltage side) of the power converter 326 is coupled to the high voltage batteries 304, and another side (e.g., a low voltage side) of the power converter 326 is coupled to the DC bus 118. In such configurations, the DC-DC power converter 326 is coupled in parallel with the power converter 312.

Additionally, the DC-DC power converter 326 may operate unidirectionally or bi-directionally. For example, the power converter 326 may include a converter topology that allows power to flow in only one direction (e.g., from the high voltage side to the low voltage side) or both directions, as explained herein. When the DC-DC power converter 326 operates as a unidirectional converter, a load-dump circuit may be employed to effectively disconnect the power converter 326 if reverse power flow (e.g., from the low voltage side to the high voltage side) occurs.

The DC-DC power converter 326 is configured to mitigate a transient load condition on the DC bus 118, as further explained below. For example, the DC-DC power converter 326 may be controlled to have a faster transient response time than the power converter 312. As a result, a low voltage battery module coupled to the DC bus 118 and the low voltage side of the power converter 312 may be reduced in size, and in some cases removed from the ESS 300. For example, in FIG. 3, the ESS 300 does not include a low voltage battery module.

For example, the controller 320 may control the power converter 326 to mitigate a transient load condition on the DC bus 118 by transmitting one or more control signals 322 to the power converter 326 for controlling one or more switching devices in the converter 326 at a high switching frequency such as about 100 kHz or more (and/or another suitable high switching frequency as provided above). In such examples, the switching frequency of the power converter 326 may be greater than a switching frequency of the power converter 312. As a result, the power converter 326 is able to react quickly to and mitigate the effect of the transient load condition.

In other examples, the controller 320 may adjust the switching frequency of the power converter 326 in response to detecting a transient load condition on the DC bus 118 (e.g., based on one or more feedback signals 324 representing one or more operating parameters associated with the DC bus 118, etc.). Such control may be accomplished in a similar manner as explained above relative to the controller 120 and the DC-DC power converters 110, 112, 114 of FIG. 1 and the control process 200 of FIG. 2. As such, the power converter 326 can react quickly to the transient load condition as explained herein.

In some embodiments, the controller 320 may enable the power converter 326 after detecting a transient load condition. For example, the controller 320 may detect a transient load condition based on the one or more feedback signals 324 as explained above relative to FIGS. 1-2. In response to detecting the transient load condition, the controller 320 may transmit an enable signal (e.g., one of the control signals 322) to the power converter 326 thereby causing the power converter 326 to begin operating at a switching frequency of, for example, about 100 kHz or more (and/or another suitable high switching frequency as provided above).

The controller 320 may disable the power converter 326 after the transient load condition has passed. For example, the controller 320 may transmit a disable signal (e.g., one of the control signals 322) to the power converter 326 after a defined period of time, after the received operating parameters indicate the transient load condition has passed, etc.

Figure 4:
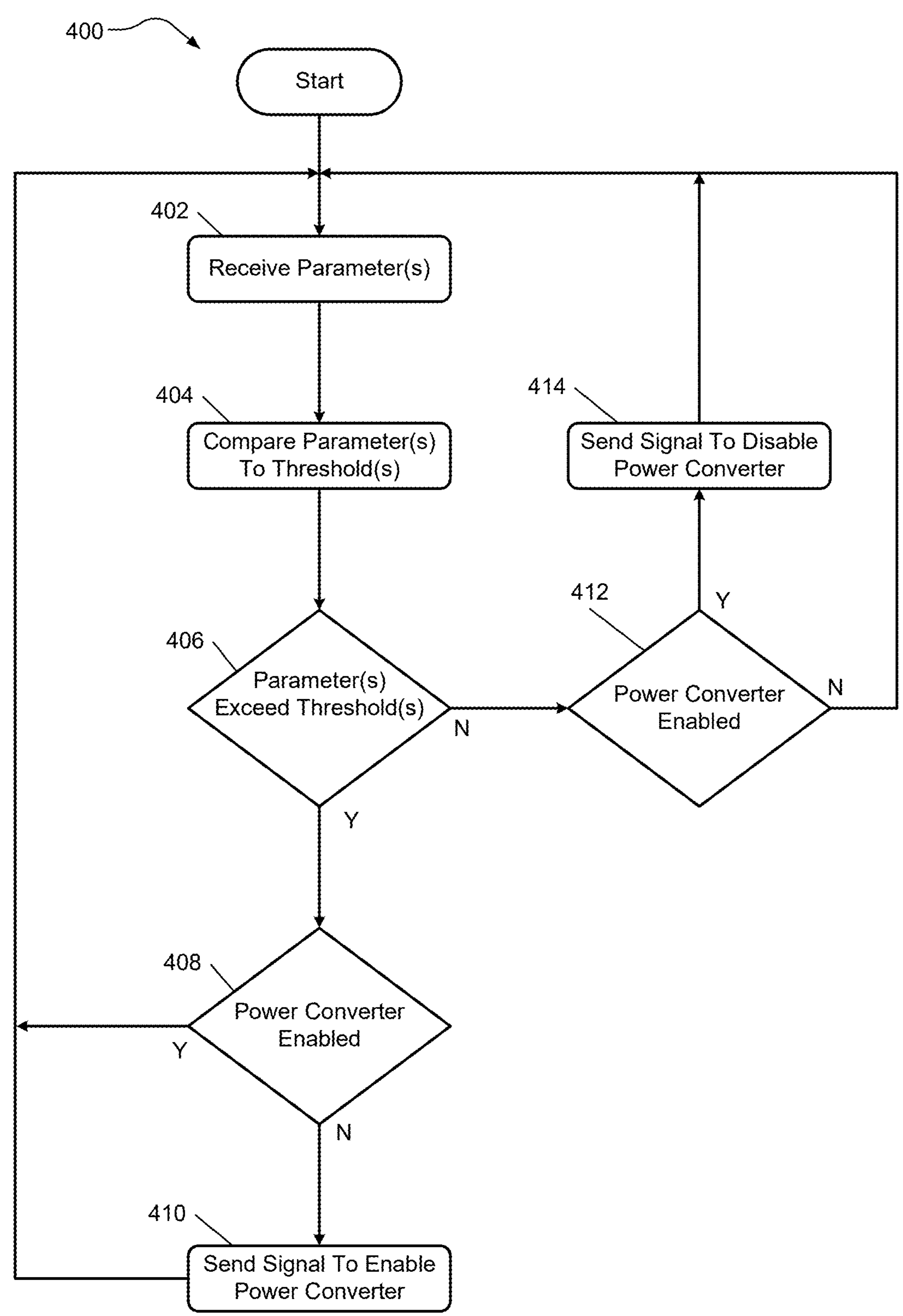
FIG. 4 is a flowchart of a control process for controlling the power converter of FIG. 3 according to the present disclosure.

FIG. 4 illustrates an example control process 400 employable by the controller 320 of FIG. 3 for controlling the DC-DC power converter 326. Although the example control process 400 is described in relation to the controller 320 and the DC-DC power converter 326, the control process 400 may be employable by any of the controllers and the DC-DC power converters disclosed herein. The control process 400 may start when the controller 320 is powered-on and/or at another suitable time.

As shown in FIG. 4, control begins at 402, where controller 320 receives one or more operating parameters via, for example, one or more feedback signals. The operating parameters may include, for example, voltages and/or currents on the low and/or high voltage sides of the converters, a voltage and/or current of the DC bus 118, etc. Control then proceeds to 404. At 404, the controller 320 compares at least one of the received operating parameters and/or a derivation thereof to at least one threshold. This may be done in a similar manner as explained above relative to the control process 200 of FIG. 2.

Control then proceeds to 406, where the controller 320 determines whether a transient load condition exists based on the comparison at 404. For example, at 406, the controller 320 may determine a transient load condition exists if any one of the received operating parameters and/or a derivation thereof exceeds an associated threshold. If so, control proceeds to 408.

At 408, the controller 320 determines whether the power converter 326 is enabled. If so, control returns to 402. In other embodiments, the controller 320 may adjust (e.g., increase) the switching frequency of the power converter 326 before returning to 402. Otherwise, control proceeds to 410 where the controller 320 sends a signal to enable the power converter 326 thereby causing the power converter 326 to begin operating. Control then returns to 402.

If the controller 320 determines at 406 that the received operating parameters and/or a derivation thereof does not exceed an associated threshold (thereby indicating a transient load condition does not exist), control proceeds to 412. At 412, the controller 320 determines whether the power converter 326 is enabled. If not, control returns to 402. Otherwise, control proceeds to 414 where the controller 320 sends a signal to disable the power converter 326 thereby causing the power converter 326 to cease operation. Control then returns to 402.

Figure 5:
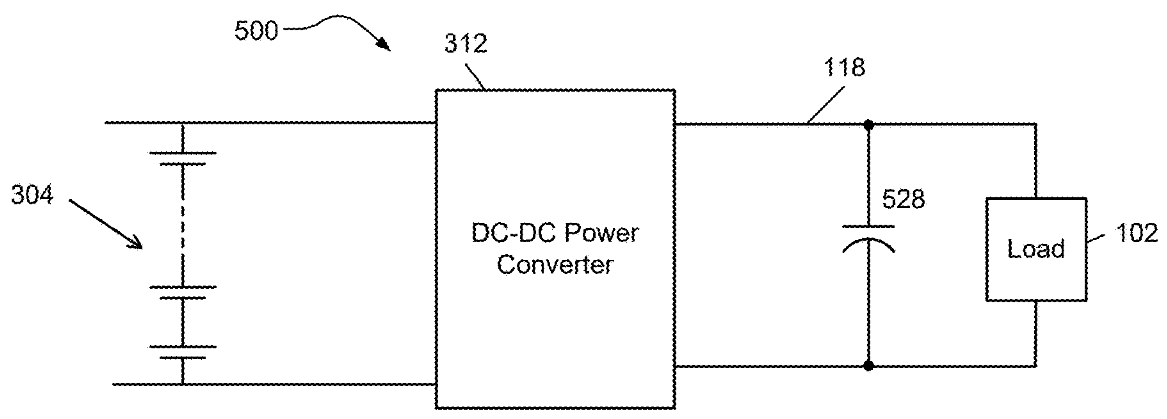
FIG. 5 is a functional block diagram of an ESS including an ultra-capacitor coupled to a DC-DC power converter, according to the present disclosure.

In various embodiments, one or more ultra-capacitors may be employed to mitigate the effect of a transient load condition on a DC bus. For example, FIG. 5 illustrates another example ESS 500 substantially similar to the ESS 100 of FIG. 1 and the ESS 300 of FIG. 3, but includes an ultra-capacitor. Specifically, the ESS 500 of FIG. 5 includes the high voltage batteries 304 and the power converter 312 of FIG. 3, and an ultra-capacitor 528. The power converter 312 provides power to the low voltage load 102 via the DC bus 118 of FIG. 1. Although the ESS 500 of FIG. 5 is shown as including only one power converter 312, it should be appreciated that the ESS 500 may include more power converters (e.g., the DC-DC power converters 110, 112, 114 of FIG. 1, etc.) in other embodiments.

As shown, the ultra-capacitor 528 is coupled to the DC bus 118 and the low voltage side of the power converter 312. Although a single ultra-capacitor 528 is shown in FIG. 5, it should be appreciated that multiple ultra-capacitors may be employed. Additionally, while the ultra-capacitor 528 is shown as being coupled to the low voltage side of the power converter 312, in other embodiments the power converter 312 (or each of the DC-DC power converters if more than one is employed) may include an ultra-capacitor (e.g., similar to the ultra-capacitor 528) at its low voltage side.

In the embodiment of FIG. 5, the ultra-capacitor 528 (sometimes called a supercapacitor) is a high-capacity capacitor. For example, the ultra-capacitor 528 has a capacitance value much higher than typical filtering capacitors (e.g., electrolytic capacitors) and lower than a battery (e.g., a rechargeable battery such as employed in the low voltage battery module 116 of FIG. 1). As such, the ultra-capacitor 528 is capable of storing many times (e.g., 10 to 100 times, etc.) more energy than typical filtering capacitors while discharging much faster than a battery. In some embodiments, the ultra-capacitor 528 may have a capacitance of about one farad or more.

The ultra-capacitor 528 is configured to mitigate a transient load condition on the DC bus 118. For example, the ultra-capacitor 528 may store energy provided by the power converter 312 during normal operation. Once a transient load condition occurs, the ultra-capacitor 528 may quickly discharge into the DC bus 118 and provide necessary power to the low voltage load 102, thereby mitigating the effect of the transient load condition. As such, a low voltage battery module coupled to the DC bus 118 and the low voltage side of the power converter 312 may be unnecessary, and therefore not included in the ESS 500 as shown in FIG. 5.

Figure 6:
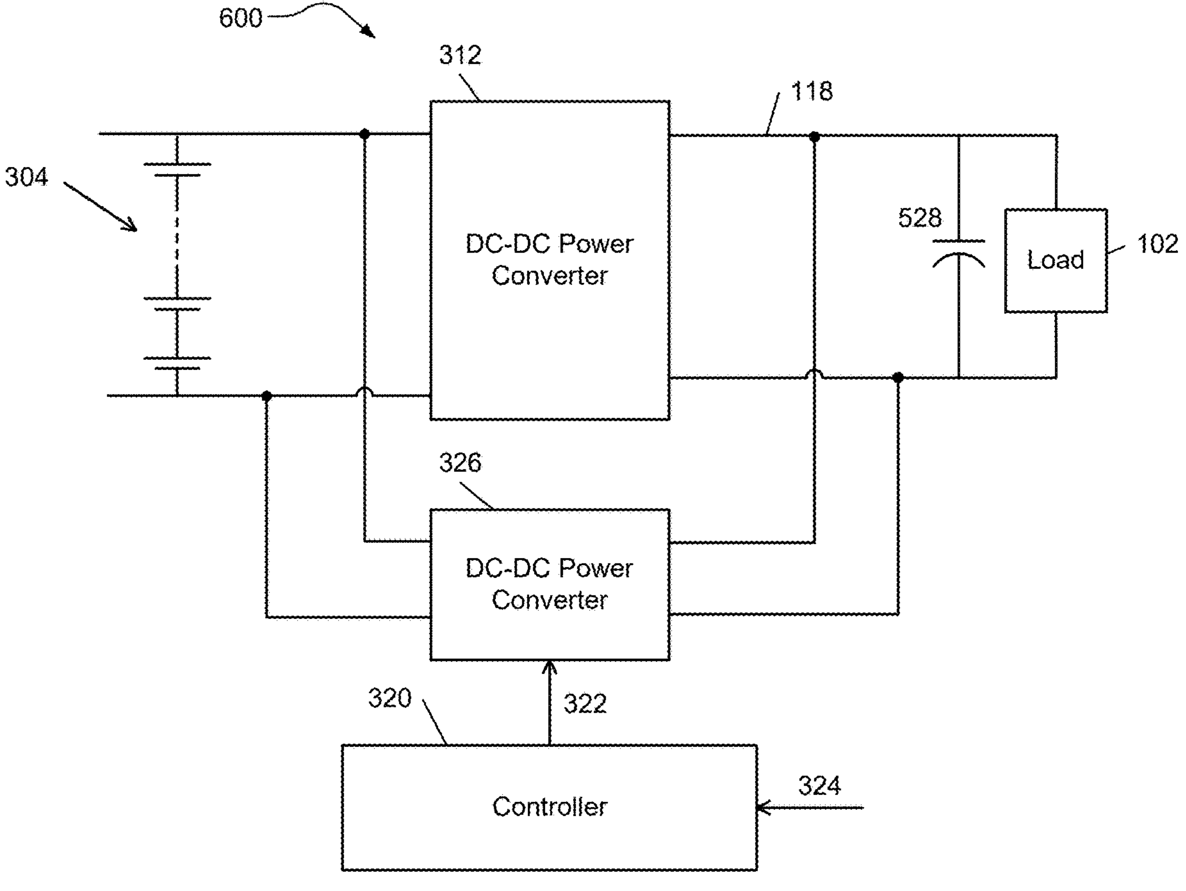
FIG. 6 is a functional block diagram of an ESS including a power converter coupled in parallel with the DC-DC power converter of FIG. 5, according to the present disclosure.

In various embodiments, the ESS 500 of FIG. 5 may include an additional DC-DC power converter coupled in parallel with the power converter 312 to mitigate a transient load condition on the DC bus 118. For example, FIG. 6 illustrates an ESS 600 substantially similar to the ESS 500 of FIG. 5 but includes an additional DC-DC power converter. Specifically, the ESS 600 of FIG. 6 includes the high voltage batteries 304, the power converter 312 and the ultra-capacitor 528 of FIG. 5, and the DC-DC power converter 326 of FIG. 3 coupled in parallel with the power converter 312. Although the ESS 600 of FIG. 6 is shown as including only one power converter 312, it should be appreciated that the ESS 600 may include more power converters (e.g., the DC-DC power converters 110, 112, 114 of FIG. 1, etc.) in other embodiments.

The DC-DC power converter 326 may be controlled in a similar manner as explained above to mitigate the effects of a transient load condition on the DC bus 118. For example, the ESS 600 includes the controller 320 of FIG. 3 that transmits the control signals 322 to the power converter 326 for controlling one or more switching devices in the converter 326 at a high switching frequency as explained herein. The controller 320 may control the power converter 326 in such a manner in response to detecting the transient load condition based on the received feedback signals 324 as explained above.

Figure 7:
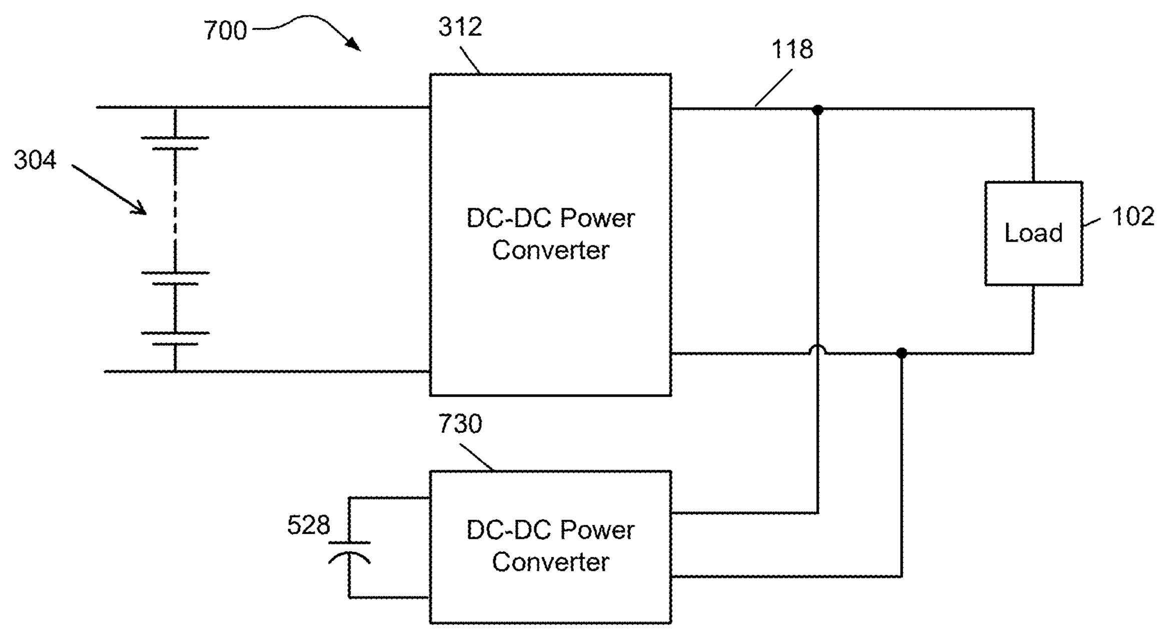
FIG. 7 is a functional block diagram of an ESS including the capacitor of FIG. 5 and a power converter coupled to the capacitor, according to the present disclosure.

In other embodiments, the ESS 500 of FIG. 5 may include an additional DC-DC power converter coupled in parallel with the ultra-capacitor 528 to mitigate a transient load condition on the DC bus 118. For example, FIG. 7 illustrates an ESS 700 substantially similar to the ESS 500 of FIG. 5 but includes an additional DC-DC power converter. Specifically, the ESS 700 of FIG. 7 includes the high voltage batteries 304, the power converter 312 and the ultra-capacitor 528 of FIG. 5, and a DC-DC power converter 730 coupled in parallel with the ultra-capacitor 528. For example, and as shown in FIG. 7, the DC-DC power converter 730 is coupled between the ultra-capacitor 528 and the DC bus 118. Although the ESS 700 of FIG. 7 is shown as including only one power converter 312, it should be appreciated that the ESS 700 may include more power converters (e.g., the DC-DC power converters 110, 112, 114 of FIG. 1, etc.) in other embodiments.

In the embodiment of FIG. 7, the DC-DC power converter 730 may be a non-isolated, bi-directional DC-DC power converter. For example, power converter 730 may include a converter topology that allows power to flow both directions. As such, power may flow from the low voltage side of the power converter 312 through the power converter 730 to charge the ultra-capacitor 528. Additionally, power may discharge from the ultra-capacitor 528 and flow through the power converter 730 to the DC bus 118.

The DC-DC power converter 730 may be controlled in a similar manner as explained above to mitigate the effects of a transient load condition on the DC bus 118. For example, the ESS 700 may include a controller (not shown) similar to the controller 320 of FIG. 3 that transmits one or more control signals to the power converter 730 for controlling one or more switching devices at a high switching frequency as explained herein. As such, when a transient load condition occurs (and is detected as explained herein), the DC-DC power converter 730 may provide necessary power to the low voltage load 102 through the discharge of the ultra-capacitor 528. As a result, a low voltage battery module coupled to the DC bus 118 and the low voltage side of the power converter 312 may be unnecessary, and therefore not included in the ESS 700 as shown in FIG. 7.

Figure 8:
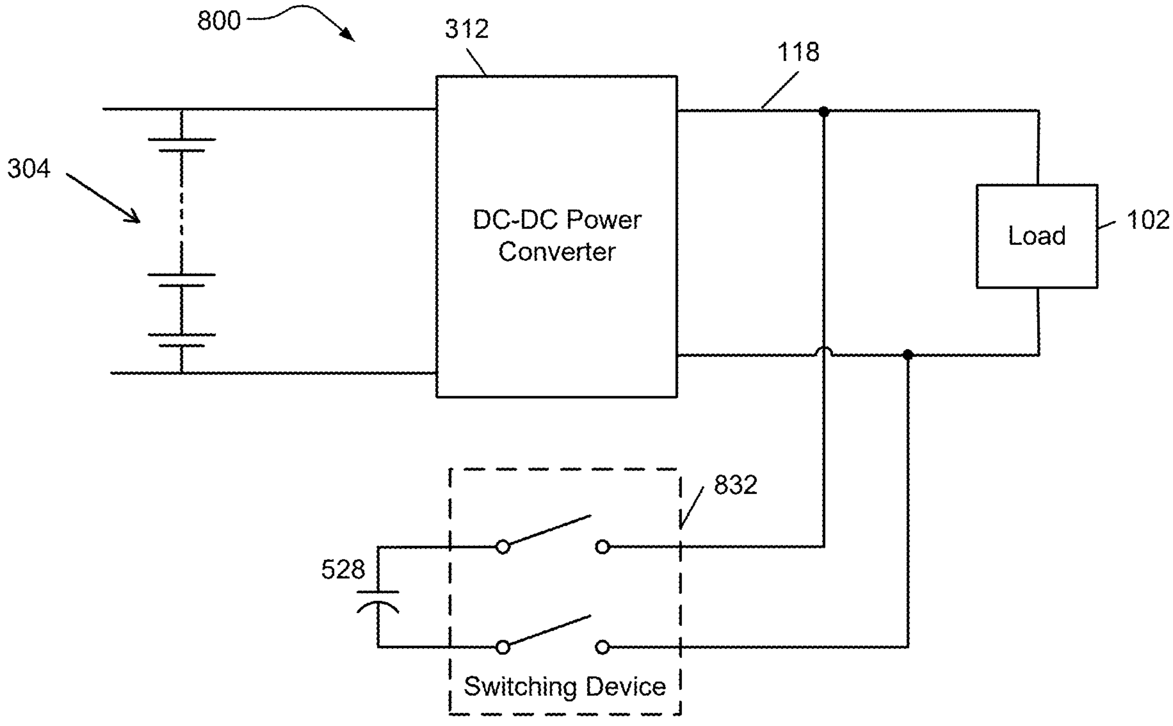
FIG. 8 is a functional block diagram of an ESS including the ultra-capacitor of FIG. 5 and a switching device coupled to the ultra-capacitor, according to the present disclosure.

In other embodiments, the DC-DC power converter 730 of FIG. 7 may be replaced with a switching device. For example, FIG. 8 illustrates an ESS 800 substantially similar to the ESS 700 of FIG. 7 but includes a switching device coupled between the ultra-capacitor 528 and the DC bus 118. More specifically, the ESS 800 includes the high voltage batteries 304, the power converter 312 and the ultra-capacitor 528 of FIG. 7, and a switching device 832 coupled between the ultra-capacitor 528 and the DC bus 118. As shown in FIG. 8, the switching device 832 includes two switches coupled on opposing sides of the ultra-capacitor 528. Although the ESS 800 of FIG. 8 is shown as including only one power converter 312, it should be appreciated that the ESS 800 may include more power converters (e.g., the DC-DC power converters 110, 112, 114 of FIG. 1, etc.) in other embodiments.

The switches of the switching device 832 may be controlled in a similar manner as explained above to mitigate the effects of a transient load condition on the DC bus 118. For example, the ESS 800 may include a controller (not shown) that transmits one or more control signals to the switching device 832 for controlling the activation and deactivation of the switching devices. For instance, the switching devices may be closed for a period of time to allow power from the low voltage side of the power converter 312 to pass therethrough and charge the ultra-capacitor 528. Additionally, when a transient load condition occurs (and is detected as explained herein), the switching devices may be closed to provide necessary power to the low voltage load 102 through the discharge of the ultra-capacitor 528 to mitigate the effect of the transient load condition. As such, a low voltage battery module may be unnecessary, and therefore not included in the ESS 800 as shown in FIG. 8.

Figure 9:
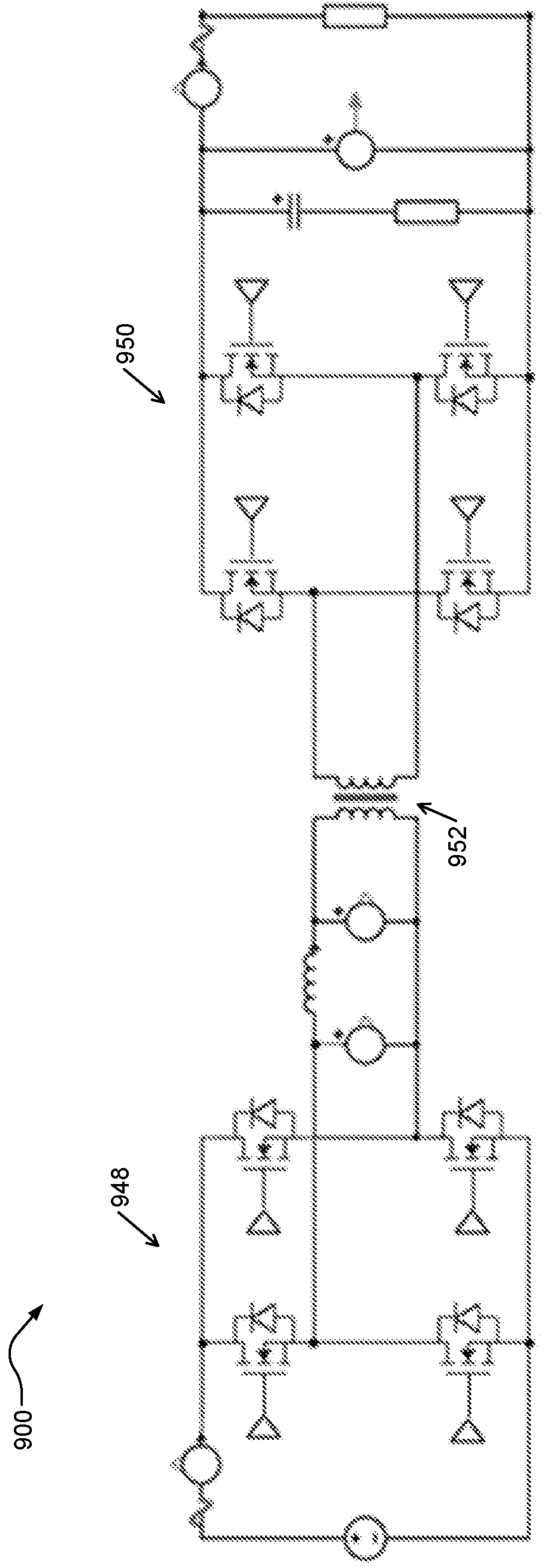
FIG. 9 is a circuit diagram of an example DC-DC power converter according to the present disclosure.

The DC-DC power converters disclosed herein may include any suitable topology. For example, FIG. 9 illustrates a power converter 900 having one example topology suitable for any one of the isolated power converters disclosed herein. Specifically, in FIG. 9, the power converter 900 is an isolated, bi-directional DC/DC power converter having a dual active full bridge topology.

As shown in FIG. 9, the DC/DC power converter 900 generally includes two bi-directional converter circuits 948, 950 and a transformer 952 coupled between the converter circuits 948, 950. When power may flow towards a low voltage side, the converter circuit 948 functions as a DC-AC inverter and the converter circuit 950 functions as an AC-DC rectifier. Conversely, when power may flow towards a high voltage side, the converter circuit 950 functions as a DC-AC inverter and the converter circuit 948 functions as an AC-DC rectifier.

In the example of FIG. 9, each converter circuit 948, 950 includes a bridge of four MOSFETs. The MOSFETs may be, for example, Silicon MOSFETs, SiC MOSFETs, etc. Although the converter circuits 948, 950 are shown as including MOSFETs, it should be appreciated that other suitable switching devices may employed such as, for example, IGBTs, GaN-on-Silicon HEMTs, GaN-Silicon Cascode JFETs, Vertical GaN FETs, power switches (e.g., made from wide band gap semiconductors such as Gallium Oxide, Diamond, etc.), etc. Additionally, in various embodiments, each switching device may include multiple switches in parallel.

Figure 10:
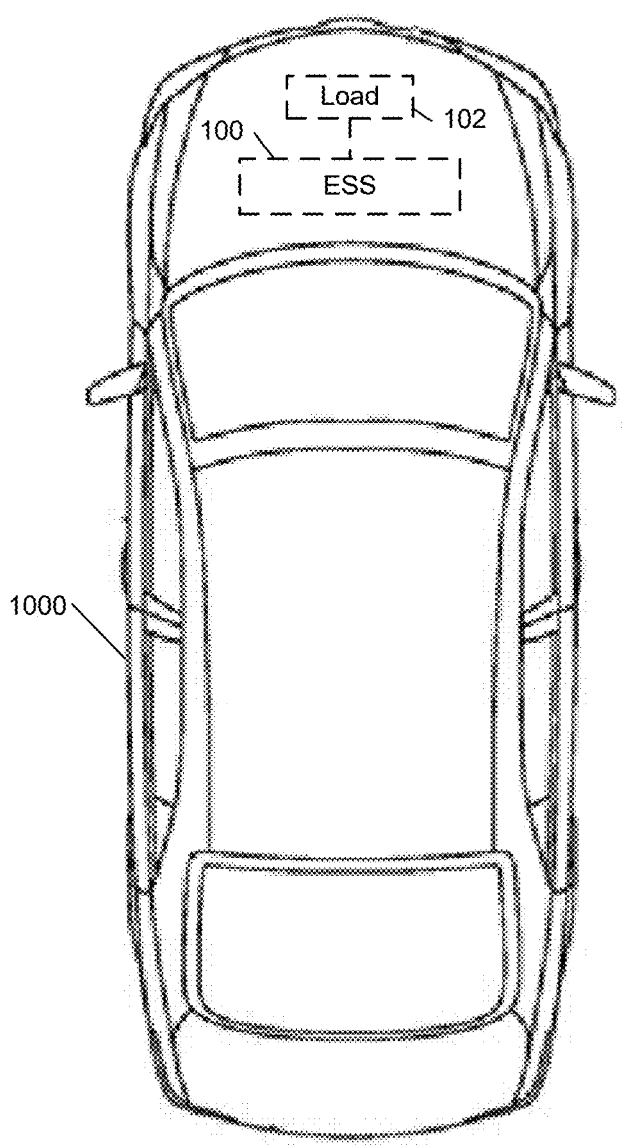
FIG. 10 is a diagram of an electric vehicle (EV) including the ESS of FIG. 1 according to the present disclosure.

Additionally, any one of the energy storage systems disclosed herein may be implemented with an EV. For example, FIG. 10 illustrates an EV 1000 including the ESS 100 of FIG. 1. In such examples, the ESS 100 may be coupled to one or more low voltage loads (e.g., the low voltage load 102 of FIG. 1, etc.) of the EV 1000. In the embodiment of FIG. 10, the EV 1000 may be, for example, a pure EV, a hybrid EV, or another suitable type of EV.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An energy storage system for an automotive vehicle, the system comprising:

a plurality of batteries coupled in series;

a plurality of first isolated DC-DC power converters configured to operate at a first switching frequency, each of the plurality of first isolated DC-DC power converters having first and second sides, each of the first sides coupled to at least one of the batteries;

a DC bus coupled to the second sides of the plurality of first isolated DC-DC power converters;

a second isolated DC-DC power converter including first and second sides coupled in parallel with the plurality of first isolated DC-DC power converters, the first side of the second isolated DC-DC power converter coupled to the plurality of batteries coupled in series and the second side of the second isolated DC-DC power converter coupled to the DC bus; and at least one controller coupled to the second isolated DC-DC power converter, the at least one controller configured to:

detect a transient load condition;

in response to detecting the transient load condition, transmit an enable signal to the second isolated DC-DC power converter to cause the second isolated DC-DC power converter to begin operating; and control the second isolated DC-DC power converter at a second switching frequency greater than the first switching frequency of the plurality of first isolated DC-DC power converters.

2. The energy storage system of claim 1, wherein the system does not include a battery module coupled to the second sides of the plurality of first isolated DC-DC power converters.

3. The energy storage system of claim 2, wherein the second isolated DC-DC power converter is a bi-directional DC-DC power converter.

4. The energy storage system of claim 3, wherein at least one of the plurality of first isolated DC-DC power converters is a bi-directional DC-DC power converter.

5. The energy storage system of claim 2, further comprising at least one ultra-capacitor coupled to the DC bus.

6. The energy storage system of claim 5, wherein the at least one ultra-capacitor has a capacitance of at least one farad.

7. The energy storage system of claim 2, wherein each of the second sides of the plurality of first isolated DC-DC power converters are coupled in parallel.

8. The energy storage system of claim 1, wherein a transient response time of the second isolated DC-DC power converter is faster than a transient response time of the plurality of first isolated DC-DC power converters.

9. The energy storage system of claim 1, wherein the at least one controller is configured to control at least one isolated DC-DC power converter of the plurality of isolated DC-DC power converters at a switching frequency of 10 MHz or more.

10. The energy storage system of claim 1, further comprising at least one ultra-capacitor coupled to the DC bus, the at least one ultra-capacitor having a capacitance of at least one farad.

11. An energy storage system for an automotive vehicle, the system comprising:

a plurality of batteries coupled in series;

a plurality of isolated DC-DC power converters each having first and second sides, each of the first sides coupled to at least one of the batteries;

a DC bus coupled to the second sides of the plurality of isolated DC-DC power converters;

at least one switching device coupled to the DC bus;

at least one ultra-capacitor coupled to the DC bus and the second sides of the plurality of isolated DC-DC power converters via the at least one switching device; and at least one controller coupled to the switching device, the at least one controller configured to detect a transient load condition and in response to detecting the transient load condition, transmit an enable signal to the switching device to cause the switching device to begin operating, wherein:

the at least one ultra-capacitor is configured to mitigate the transient load condition on the DC bus; and the system does not include a battery module coupled to the second sides of the plurality of isolated DC-DC power converters.

12. The energy storage system of claim 11, wherein the at least one ultra-capacitor has a capacitance of at least one farad.

13. The energy storage system of claim 12, wherein:

the plurality of isolated DC-DC power converters is a plurality of first isolated DC-DC power converters; and the system further comprises a second DC-DC power converter coupled in parallel with the at least one ultra-capacitor and including the at least one switching device.

14. The energy storage system of claim 13, wherein the second DC-DC power converter is a non-isolated DC-DC power converter.

15. The energy storage system of claim 12, wherein each of the second sides of the plurality of isolated DC-DC power converters are coupled in parallel.

16. The energy storage system of claim 11, wherein the at least one controller is configured to control at least one isolated DC-DC power converter of the plurality of isolated DC-DC power converters at a switching frequency of 10 MHz or more.

17. An energy storage system for an automotive vehicle, the system comprising:

a plurality of batteries coupled in series;

a plurality of first isolated DC-DC power converters each having first and second sides, each of the first sides coupled to at least one of the batteries;

a DC bus coupled to the second sides of the plurality of isolated DC-DC power converters;

a second isolated DC-DC power converter including first and second sides coupled in parallel with the plurality of first isolated DC-DC power converters, the first side of the second isolated DC-DC power converter coupled to the plurality of batteries and the second side of the second isolated DC-DC power converter coupled to the DC bus; and at least one controller coupled to the plurality of first isolated DC-DC power converters and the second isolated DC-DC power converter, the at least one controller configured to:

control at least one isolated DC-DC power converter of the plurality of first isolated DC-DC power converters at a switching frequency of 10 MHz or more to mitigate a transient load condition on the DC bus;

detect the transient load condition; and in response to detecting the transient load condition, transmit an enable signal to the second isolated DC-DC power converter to cause the second isolated DC-DC power converter to begin operating.

18. The energy storage system of claim 17, wherein the system does not include a battery module coupled to the second sides of the plurality of isolated DC-DC power converters.

19. The energy storage system of claim 17, wherein each of the second sides of the plurality of isolated DC-DC power converters are coupled in parallel.

20. The energy storage system of claim 17, wherein the second isolated DC-DC power converter is a bi-directional DC-DC power converter.

* * * * *